United States Patent [19]

Nakaya

[11] Patent Number: 6,101,297
[45] Date of Patent: Aug. 8, 2000

[54] WAVEGUIDE TYPE POLARIZATION SCRAMBLER

[75] Inventor: Ken-Ichi Nakaya, Tokyo, Japan

[73] Assignee: NEC Corporation, Tokyo, Japan

[21] Appl. No.: 08/874,738

[22] Filed: Jun. 13, 1997

[30] Foreign Application Priority Data

Jul. 11, 1996 [JP] Japan .................................. 8-181719

[51] Int. Cl.$^7$ ..................................................... G02B 6/10
[52] U.S. Cl. ..................................................... 385/3; 385/9
[58] Field of Search ..................................... 385/2, 3, 8, 9

[56] References Cited

U.S. PATENT DOCUMENTS 5,787,211   7/1998   Gopalakrishnan ........................... 385/2

OTHER PUBLICATIONS

Heismann, et al., "Electrooptic Polarization Scramblers for Optically Amplified Long–Haul Transmission Systems", IEEE Photonics Technology Letters, vol. 6, No. 9, Sept. 1994, pp. 1156–1158.

*Primary Examiner*—Hung N. Ngo
*Attorney, Agent, or Firm*—Whitham, Curtis & Whitham

[57] ABSTRACT

A waveguide type polarization scrambler is provided with; a Mach-Zehnder interferometic waveguide having the first input and output optical waveguides and second output and output waveguides on a dielectric substrate, a phase modulator having the third input output optical waveguides and fourth input and output waveguides and second input and output optical waveguides are connected to the third input and output waveguides, a light input means for inputting a light signal to the first input and output optical waveguides, and a light output means for receiving the light emitted from the fourth input and output optical waveguides. It is possible to apply tolerant device fabrication process conditions without complex fabrication process and possible to adjust easily the output light to randomized polarization state without exact adjustment of the optical axis. In a waveguide type polarization scrambler which utilizes a dielectric substrate, the deterioration of randomized polarization state due to polarization dependency caused in the waveguide type polarization scrambler is prevented.

10 Claims, 8 Drawing Sheets

OPTICAL WAVEGUIDE 2 POLARIZATION DEPENDENCY:|ΔL|(dB)

CORRELATION BETWEEN PORARIZATION DEPENDENCY : |ΔL| OF OPTICAL WAVEGUIDE 2 AND DOP FOR
(THE CASE OF LINEARPOLARIZATION WITH INCIDENT INCLINATION OF 45°)

CORRELATION BETWEEN PORARIZATION DEPENDENCY ΔL OF OPTICAL WAVEGUIDE 2
AND INCIDENT LINEAR POLARIZATION CONTROL ANGLE Δθ FOR DOP=0

ANGLE DEVIATION |Δθ1| (°) FROM THE OPTIMAL ANGLE θ1 FOR DOP=0

CORRELATION BETWEEN ANGLE DEVIATION |Δθ1| FROM THE OPTIMAL ANGLE θ1 FOR DOP=0 AND DOP

QUENCHING RATIO CHARACTERISTICS TO VOLTAGE APPLIED
TO MACH-ZEHDER INTERFEROMETIC SECTION
(TM MODE HALF WAVELENGTH VOLTAGE V$\pi$ IS ASSUMED TO BE 1)

WAVEGUIDE TYPE POLARIZATION SCRAMBLER

BACKGROUND OF THE INVENTION

1. Field of the Invention

This invention relates to a waveguide type optical device used for ultra high speed trunk fiber-optic transmission system, and more particularly relates to waveguide type polarization scrambler.

2. Description of Related Art

As the fiber-optic transmission system has been used practically, an advanced large capacity multi-functional transmission system including high speed generation of optical signals, wavelength multiplexing in the same optical transmission path, and switching and exchanging of optical transmission paths is desired to be developed.

In the current fiber-optic transmission system, the optical transmission technology employs the direct modulation method that involves direct control of injection current to a semiconductor laser or light emitting diode which are provided as a light source. The direct modulation is not suitable for high speed modulation of several GHz or higher because of relaxation oscillation, and cannot be used for high speed trunk fiber-optic transmission because of wavelength fluctuation.

A method in which an external modulation type modulator is used has been known as a method to solve the above-mentioned disadvantage, particularly, an optical waveguide type optical external modulator comprising an optical waveguide formed on a dielectric substrate which has optical effect has characteristics of small-size, high efficiency and high speed. Especially, optical external modulators which utilize dielectric material such as lithium niobate ($LiNbO_3$) crystal have characteristic of small optical absorption, low optical loss, and high modulation efficiency for high electro-optic coefficient. Therefore many developments have addressed on the optical external modulator, and particularly, Mach-Zehnder interferometric type and directional coupling type external modulators have been proposed and partially used practically.

Recently, a trunk fiber-optic transmission system having a large capacity exceeding G bps has been realized by applying practically the external modulator which utilizes lithium niobate. On the other hand, rapid progress and practical application of optical amplifiers using $Er^+$ doped optical fiber enables long distance fiber-optic transmission exceeding several thousands kilometers.

However, the long distance fiber-optic transmission using the optical amplifier involves a problem of reduced receiving sensitivity due to polarization fluctuation in a optical path of transmission system and polarization-dependent gain (PDG) in the optical amplifier. To solve the problem, a method in which the polarization of signal light in an optical path of transmission system is scramble has been known, and F. Heismann et. al. ("Electrooptic Polarization Scramblers for Optically Amplified Long-Haul Transmission Systems", IEEE Photonics Technology Letters, Vol. 6, No. 9, September, 1994, pp. 1156) reported the improvement of receiving sensitivity.

The waveguide scrambler is one of devices necessary for randomozed polarization state of the signal light. The waveguide type polarization scrambler which utilizes an optical waveguide is one type of polarization scramblers. A conventional waveguide type polarization scrambler with the inclination of an input linear polarized light to the substrate surface of 45 degrees (refer to as inclination angle hereinafter) can give the degree of polarization of D.O.P=0 only when the insertion loss polarization dependency of the optical waveguide is zero.

However, it is difficult to fabricate polarization independent optical waveguide 2 because of variation in actual fabrication process. In the case of inclination angle of 45 degrees, with increasing in polarization dependency of the optical waveguide 2 $\Delta L$=TM insertion loss–TE insertion loss (dB), D.O.P deteriorates.

The second problem is D.O.P deterioration due to polarization dependency caused by deviation of the optical axis between the optical axis after adjustment and after completion of curing the optical axis. Because possible deviation caused when an input fiber after adjustment of the optical axis is coupled to an input port with adhesives can cause the polarization dependency of coupling loss.

SUMMARY OF THE INVENTION

It is the object of the present invention to provide a waveguide type polarization scrambler for obtaining easily polarization scrambling which can be fabricated with a wide tolerance and without a complex fabrication process.

The waveguide type polarization scrambler is provided with; a Mach-Zehnder interferometic waveguide having the first input and output optical waveguides and second input and output waveguides, a phase modulator having the third input and output optical waveguides and fourth input and output waveguides and the second input and output optical waveguides are connected to the third input and output waveguides, a light input means for inputting a light signal to the first input and output optical waveguides, and a light output means for receiving the light emitted from the fourth input and output optical waveguides on a dielectric substrate.

The waveguide type polarization scrambler is provided with; a Mach-Zehnder interferometic waveguide having the first input and output optical waveguides and second input and output waveguides, a phase modulator having the third input output optical waveguides and fourth input and output waveguides and second input and output optical waveguides are connected to the third input and output waveguides, a light input means for inputting a light signal to the fourth input and output optical waveguides, and a light output means for receiving the light emitted from the first input and output optical waveguides on a dielectric substrate. Lithium niobate, and Z-cut may be used for the dielectric optical waveguide substrate.

In the waveguide type polarization scrambler of the present invention is featured in that the Mach-Zehnder interferometic section and linear optical waveguide phase modulation section are formed on the surface of the dielectric substrate and the Mach-Zehnder interferometic section and the phase modulation section are connected each other, and the polarization dependency caused in the optical waveguide type polarization scrambler is compensated by means of Mach-Zehnder interferometic section.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

First, a conventional polarization scrambler is described before a waveguide type polarization scrambler of the present invention is described for easy understanding of the present invention.

Figure 1:
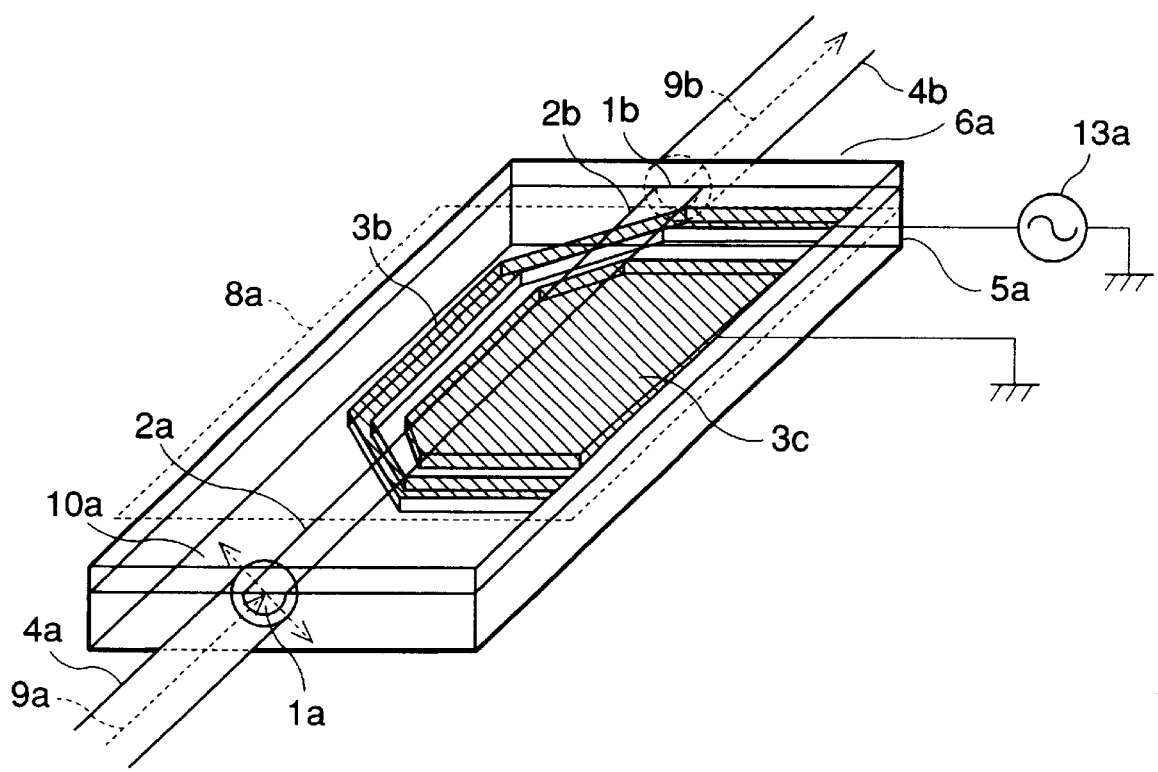
FIG. 1 is a view for illustrating an example of the structure of a conventional waveguide type polarization scrambler.

FIG. 1 shows the structure of a conventional waveguide type polarization scrambler. In FIG. 1, a waveguide 2 of a polarization scrambler of the present invention is fabricated on a lithium niobate (LiNbO₃) z-cut substrate. A portion having refractive index slightly higher than the substrate is used as the optical waveguide 2, and the optical waveguide 2 is formed by thermal diffusion of titanium into the substrate. A optical buffer layer 6a consisting of silicon dioxide (SiO₂) is provided on the optical waveguide 2. Control electrodes 3c and 3d are provided on the optical buffer layer 6a.

Figure 2:
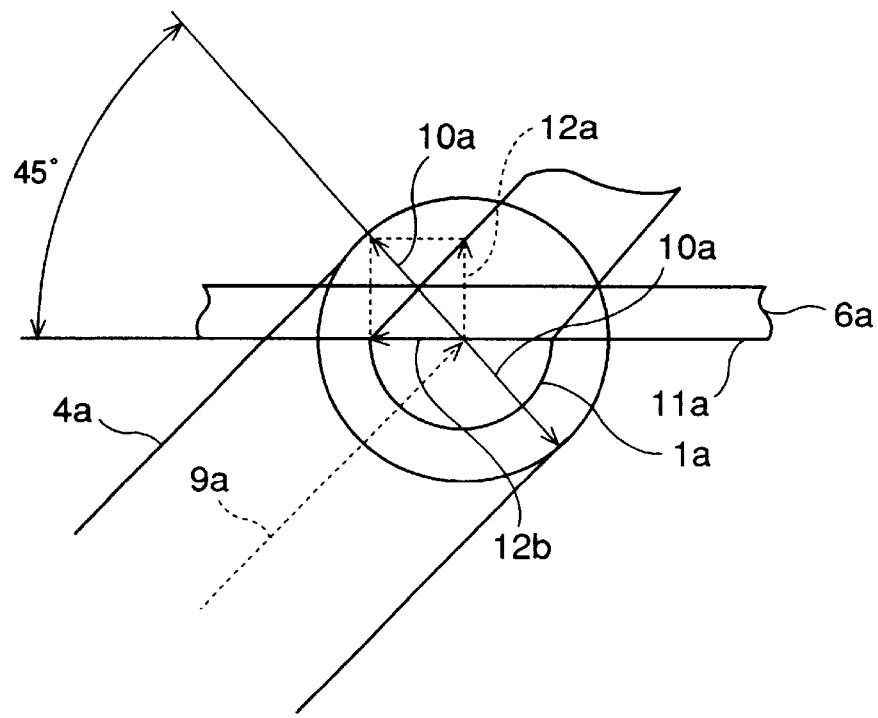
FIG. 2 is a detailed diagram of the vicinity of the input port for illustrating the layout of polarization-maintaining fiber 4a, input port 1a, and input linear polarized light 10a shown in FIG. 1.

In the conventional waveguide type polarization scrambler of the present invention, a signal light 9a from the external modulator is maintained in liner constant polarization state 10a by means of a polarization-maintaining (PANDA) fiber 4a as shown in FIG. 2. The polarized light is incident into an input port 1a with polarization direction inclined about 45 degrees with respect to the substrate surface 11a.

Figure 3:
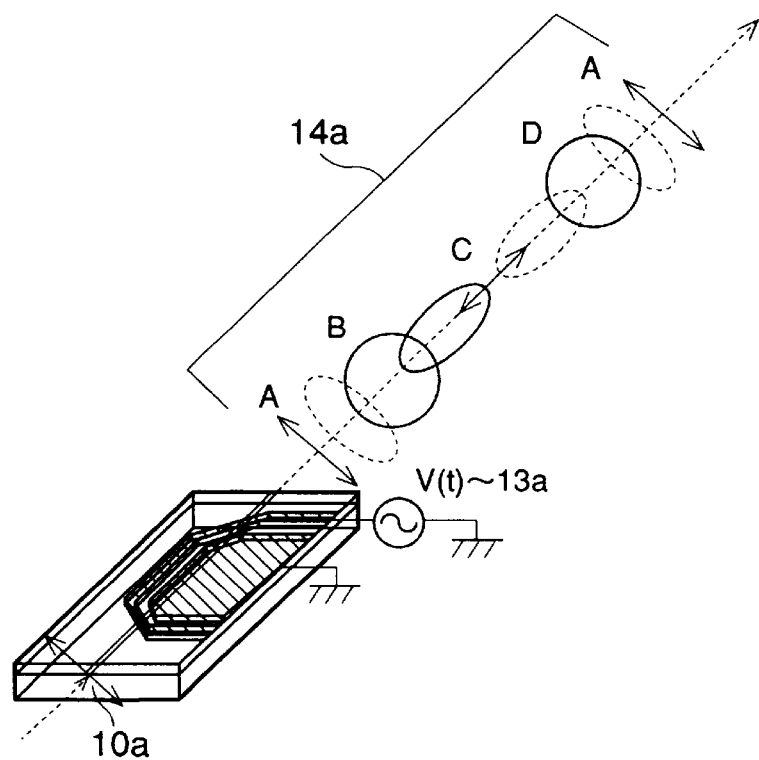
FIG. 3 is a view for illustrating operations of a waveguide type polarization scrambler.
Figure 4:
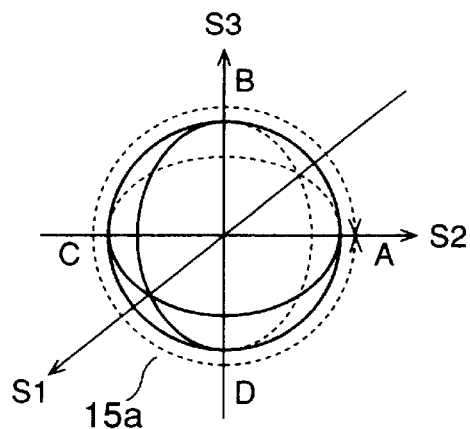
FIG. 4 is a diagram for illustrating the polarization state of output light 9b from a waveguide type polarization scrambler using Poincare sphere.

A RF phase modulation signal V (t) 13a is applied to the light incident to the input port 1a through the control electrode 3d as shown in FIG. 3. The applied voltage signal phase-modulates TM component 12a and TE component 12b of the signal light differently depending on the difference in optic coefficient (γ 33 and γ 13) of the crystal in the crystal axis direction of respective components. The polarization state 14a of the output light changes periodically on the dotted line 15a on the Poincare sphere shown in FIG. 4. Herein, the component of the electric field of the light perpendicular to the substrate surface is referred to as TM polarized light and the component of the electric field of the light parallel to the substrate is referred to as TE polarized light.

The degree of random of the polarization state 14a of the output light is represented by degree of polarization D.O.P. In detail, D.O.P is expressed by the following equation (1) using stokes parameter:

$$D.O.P. = \frac{\{\langle S_1 \rangle^2 + \langle S_2 \rangle^2 + \langle S_3 \rangle^2\}^{1/2}}{S_0}$$

wherein <> represents the mean value of RF signal oscillation period.

Optimization of the voltage amplitude and RF frequency of the RF phase modulation signal V(t) 13a results in D.O.P=0, and complete non-polarization state of the output light 9b. Usually in a transmission system which utilizes an optical amplifier, the RF frequency of 10 kHz or higher brings about the improvement of receiving sensitivity.

In a conventional optical waveguide type polarization scrambler shown in FIG. 1, for the case of 45 degree inclination (referred to as inclination angle hereinafter) of an input linear polarized light 10a with respect to the substrate surface 11a, D.O.P=0 is obtained only when the insertion loss polarization dependency of the optical waveguide 2 is 0.

Figure 5:
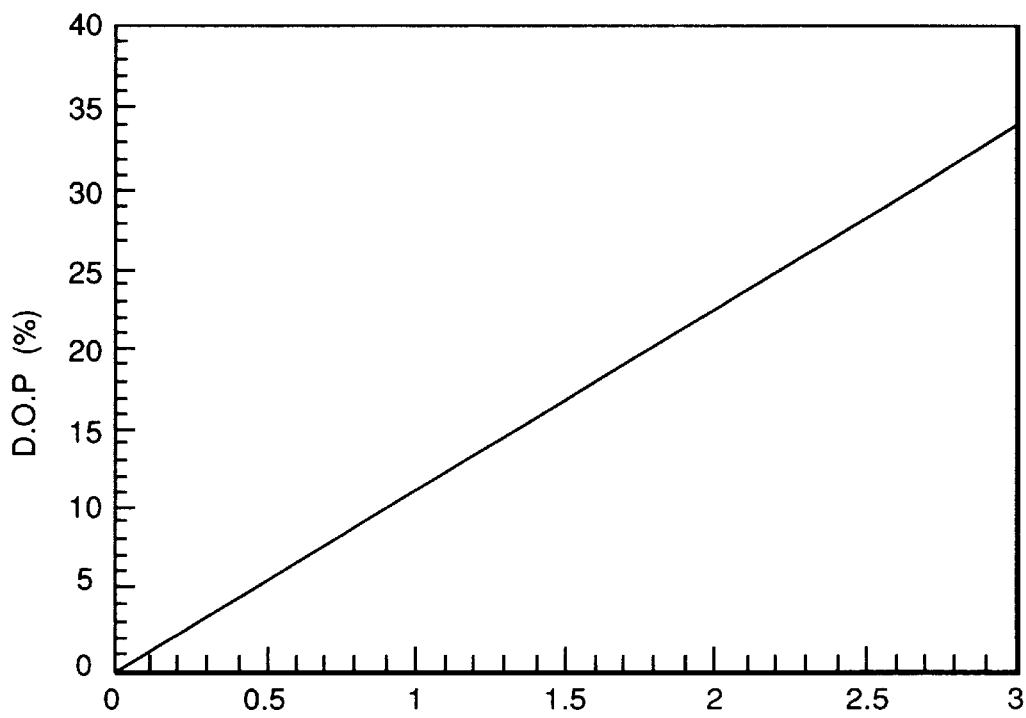
FIG. 5 is a graph for describing the correlation between the polarization dependency ΔL of the waveguide 2 and D.O.P for inclined incidence of 45 degrees of input linear polarized light 10a, FIG. 6 is a detailed diagram of the vicinity of the port 1a for illustrating the adjustment angle Δθ 16a for optical axis adjustment of the input fiber 4a for an inclination angle of 45 degrees of the input linear polarized light 10a with respect to the substrate surface 11a shown in FIG. 2.

However, it is difficult to fabricate polarization-independent optical waveguide 2 because of variation of process in actual fabrication. As shown in FIG. 5, D.O.P deteriorates with increasing of the polarization dependency ΔL of the optical waveguide 2=TM insertion loss−TE insertion loss (dB) for the case of 45 degree inclination angle of the input polarized light 10a shown in FIG. 2.

Figure 6:
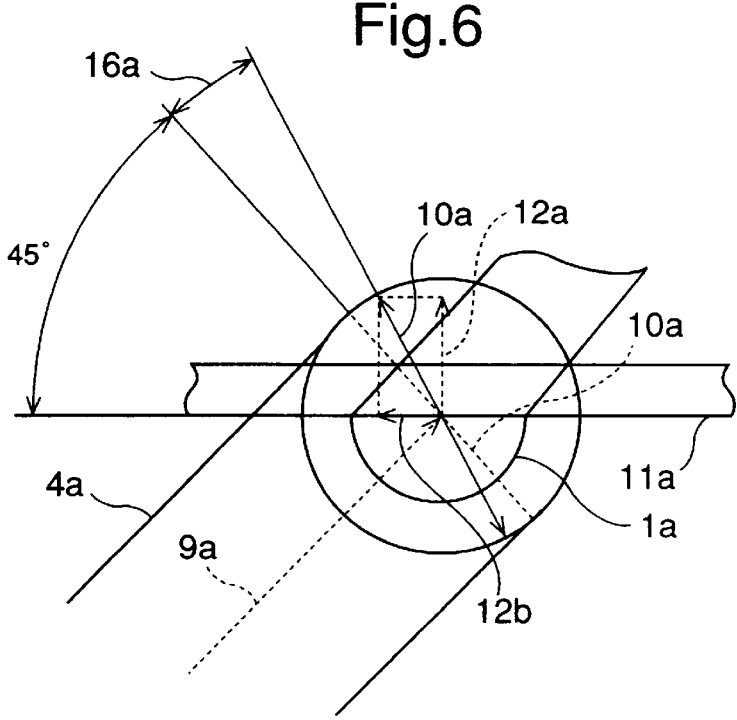
Figure 7:
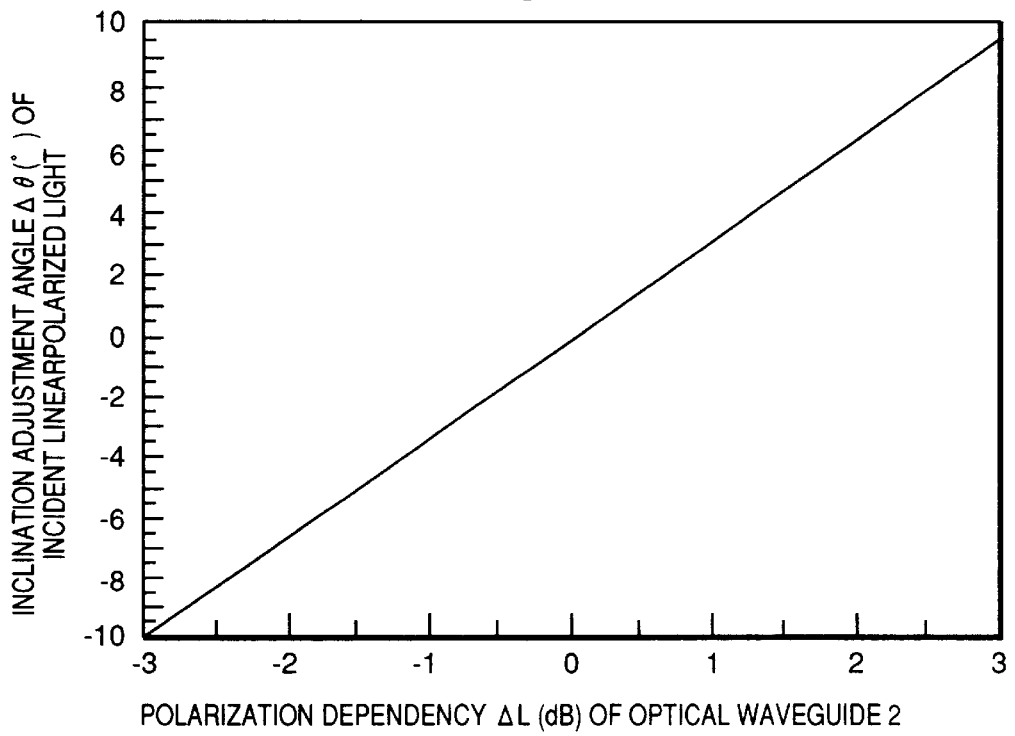
FIG. 7 is a graph for describing the correlation between the polarization dependency ΔL of the waveguide 2 and the adjustment angle Δθ 16a of the incident linear polarized light 10a for adjusting D.O.P=0.

Accordingly, the angle is adjusted so that D.O.P is minimized while polarization scramblers are being operated and D.O.P of the output light is being observed during actual fabrication process. As shown in FIG. 6, the angle of the input fiber 4a is adjusted so that the adjustment angle Δθ 16a is given to the inclination angle of the input linear polarized light of 45 degrees with respect to the substrate surface 11a. The relation between the polarization dependency of optical waveguide 2 ΔL and adjustment angle 16a under this condition is shown in FIG. 6.

Figure 8:
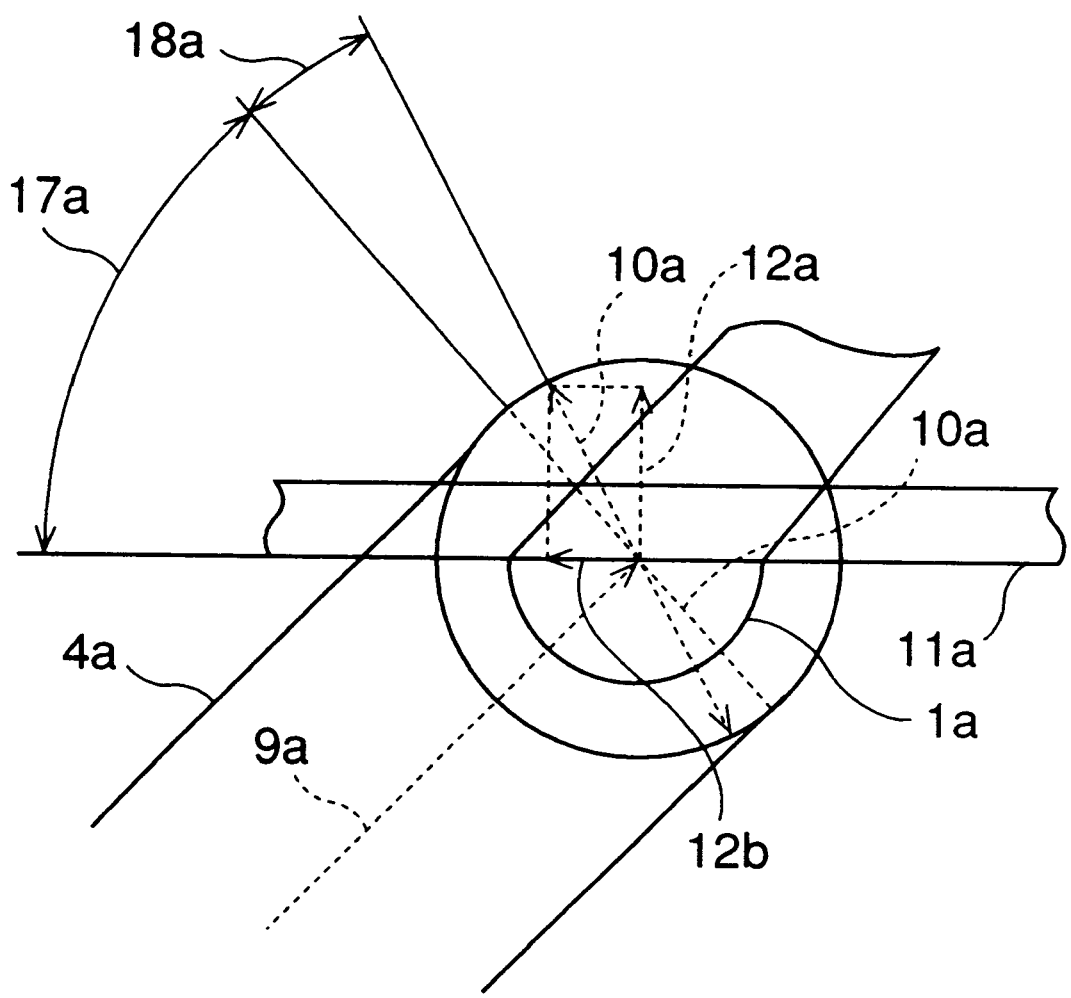
FIG. 8 is a detailed diagram of the vicinity of the port 1a for illustrating the angle deviation |Δθ1| 18a from the optimal angle θ1 17a for obtaining D.O.P=0.

The first problem of the conventional polarization scrambler shown in FIG. 1 is that D.O.P deteriorates though the angle is adjusted so that D.O.P value is minimized while D.O.P of the output light 9b is being observed. This is because the angle is adjusted so that the adjustment angle Δθ is given to the inclination angle of the input linear polarized light 10a of 45 degrees with respect to the substrate surface 11a, as shown in FIG. 6. However, as shown in FIG. 8, D.O.P deteriorates correspondingly to the increment of angle deviation |Δθ1| 18a from the optimal angle θ1 17a for D.O.P=0 of the input linear polarized light 10a.

Figure 9:
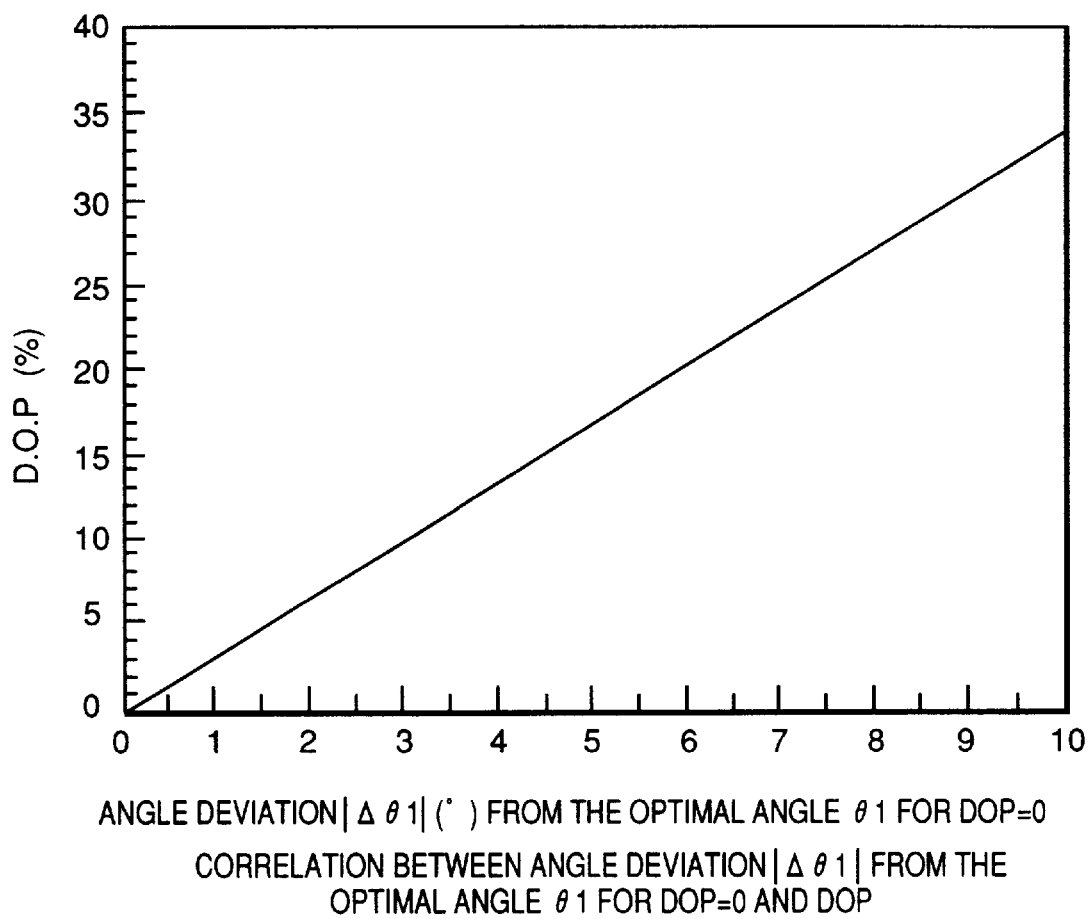
FIG. 9 is a graph for describing the correlation between the angle deviation Δθ1 18a and D.O.P in FIG. 8.

In actual fabrication process, it is difficult to accurately adjust the angle between input polarization-maintaining fiber 4a and input port 1a, and the angle deviation Δθ1 18a can be caused. Herein, the relation the optimal angle θ1 17a=45 degrees+Δθ 16a holds. The relation between the angle deviation Δθ1 18a and D.O.P in this state is shown in FIG. 9.

The second problem is that the polarization dependency due to optical axis deviation caused during a period from the time after adjustment of the optical axis to the time of completion of curing of the optical axis causes the deterioration of D.O.P because possible polarization dependency of coupling loss due to the optical axis deviation caused when the input fiber 4a and input port 1a are bonded with adhesives to fix.

Next, embodiments of the waveguide type polarization scrambler of the present invention are described herein withreference to the drawings.

Figure 10:
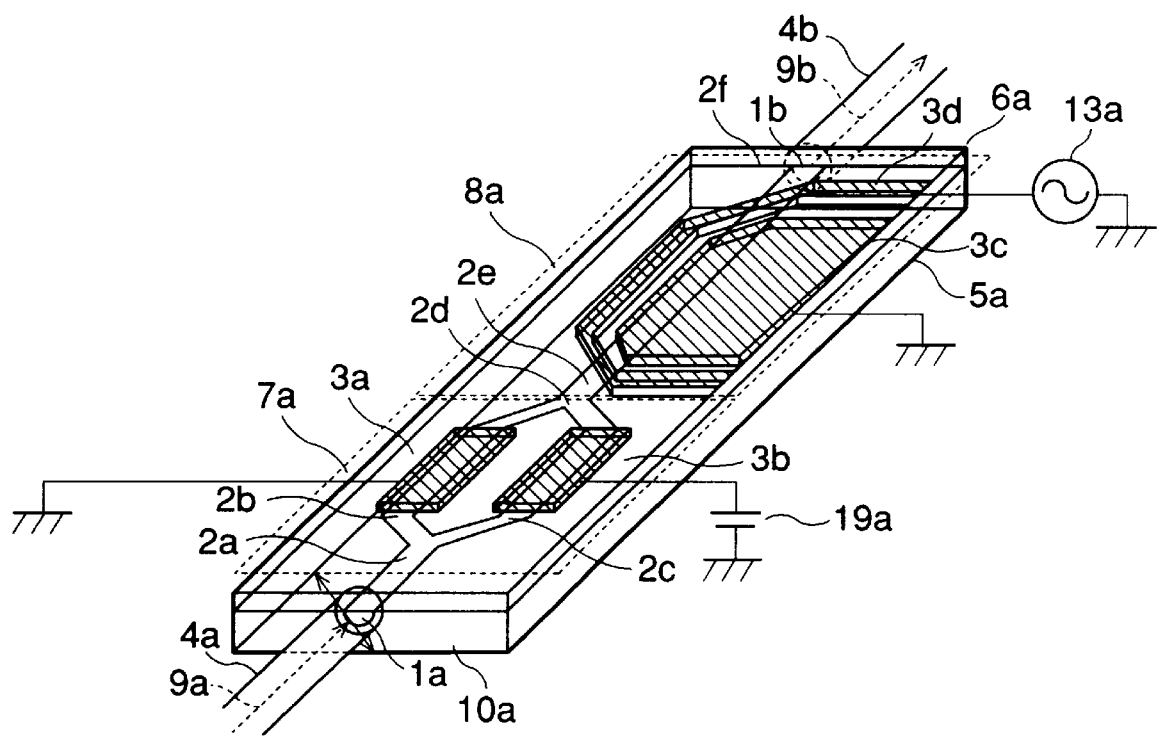
FIG. 10 is a view for illustrating the structure of an embodiment of a waveguide type polarization scrambler of the present invention.

FIG. 10 shows the structure of an embodiment of a polarization scrambler of the present invention. Herein, an example of Ti diffusion type Z-cut Y-propagation transmission $LiNbO_3$ waveguide type polarization scrambler is shown.

First, an example of fabrication method of waveguide type polarization scramblers is described. In FIG. 10, a Ti film is deposited on a $LiNbO_3$ substrate 5a, and patterning is performed on an optical waveguide pattern. Thereafter, an optical waveguide 2 is formed on the surface of the substrate 5a by thermal indiffusion of the Ti film. Subsequently, an optical buffer layer 6a is formed to suppress absorption of waveguide light into the metal film electrode, and metal film electrodes 3a and 3b are formed on the optical waveguides 2b and 2c. A metal film electrode 3c is formed on the optical waveguide 2e and a metal film 3d is formed near the optical waveguide 2e. Mach-Zehnder interferometric section 7a consists of the optical waveguides 2b, 2c and the electrodes 3a, 3b. The phase modulation section 8a consists of the optical waveguide 2e and the electrode 3d. The output waveguide 2d of the Mach-Zehnder interferometic section 7a and the input waveguide 2e of the phase modulation section 8a are connected together.

Next, operations of this embodiment of the waveguide type polarization scrambler of the present invention shown in FIG. 10 is described.

In FIG. 10, the light incident from the port 1a is incident to the Mach-Zehnder interferometic section 7a, and outputted to the optical waveguide 2d. Herein the input polarization-maintaining fiber 4a is adjusted so that the input linear polarized light 10a inclination angle is about 45 degrees.

Figure 11:
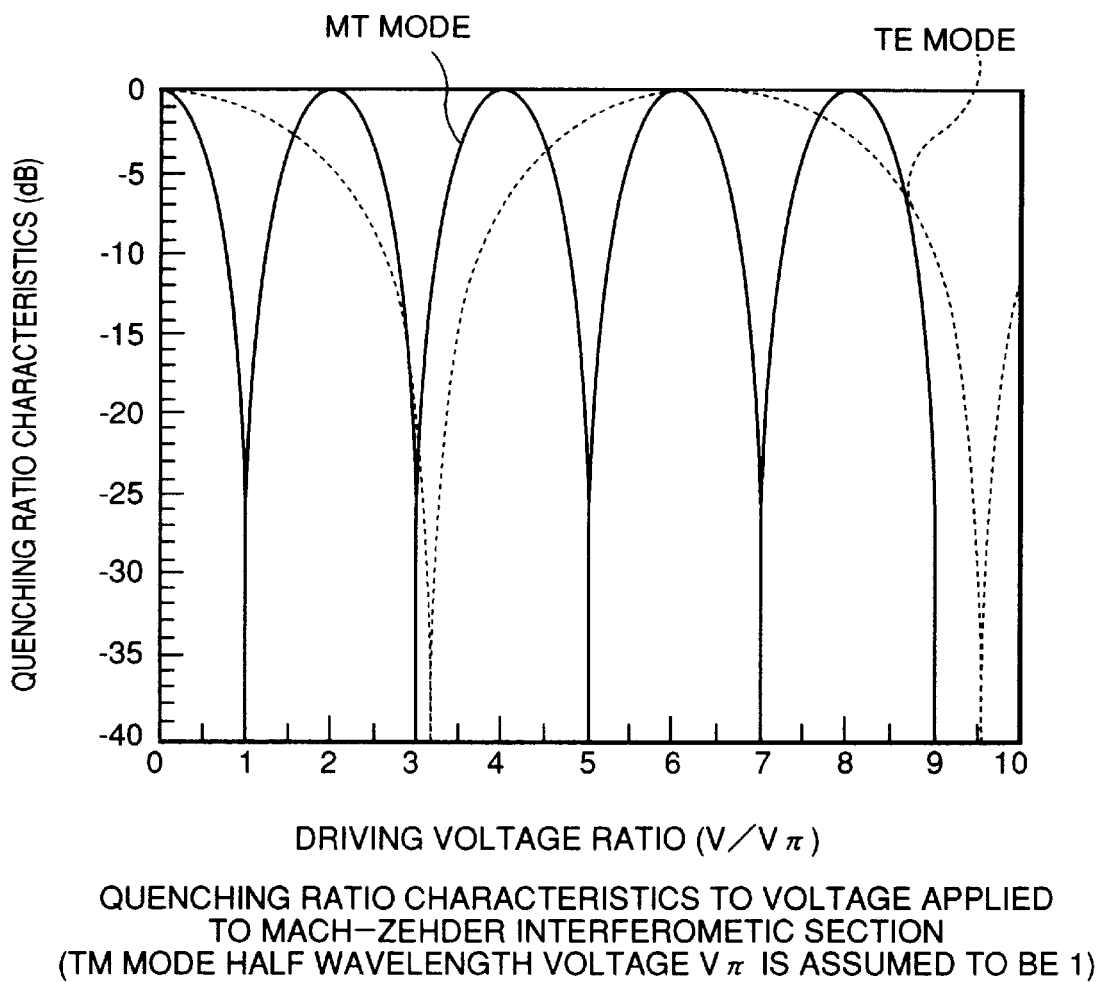
FIG. 11 is a graph for describing the correlation between the driving voltage ratio of Mach-Zehnder interferometric section 7a and the extinction ratio characteristics in TE and TM modes for a case of normalization with half-wavelength voltage Vπ in TM mode.

When, in the case that a control voltage Vd 19a is applied to the Mach-Zehnder interferometic section 7a, the optical power of TM mode 12a and TE mode 12b outputted to the optical waveguide 4d decays based on extinction ratio characteristics corresponding to the applied voltage shown in FIG. 11. Afterwards, the light proceeds to the incident optical waveguide 4e of the phase modulation section 8a, and in the case that RF phase modulation signal V(t) 13a is applied, the output light 9a is subjected to polarization scrambling and the output light 9a becomes randomized polarization state, and is emitted from the port 1b.

If the phase modulation section 8a has the polarization dependency ΔL, the angle is adjusted to give a correction angle Δθ to the incident liner polarized light. However, unless D.O.P=0 (the polarization dependency is not eliminated because of angle deviation Δθ1 18a), a control voltage Vd 19a is applied to the electrodes 3a and 3b of the Mach-Zehnder interferometic section 7a in order to cancel the residual polarization dependency. Thereby, it is possible to reduce D.O.P of the output light 9b to 0.

In the case that D.O.P deteriorates because of polarization dependency due to optical axis deviation caused when the optical axis is coupled after optical axis was adjusted, a control voltage Vd 19a which is the voltage to cancel the caused polarization dependency is applied to the electrode 3a and 3b of the Mach-Zehnder interferometic section 7a, thereby it is possible to make D.O.P of the output light 9a zero.

The structure, in which the input waveguide 2e of the phase modulation section 8a is used as the input port 1a, the output optical waveguide 2f of the phase modulation section 8a is connected to the input waveguide 2a of the Mach-Zehnder interferometic section 7a, and the output waveguide 2d of the Mach-Zehnder interferometic section 7a is used as the output port 1b, exhibits the same effect as described hereinbefore.

Next, the detail of the structure of this embodiment of the waveguide type polarization scrambler of the present invention is described.

In FIG. 10, 1.55 $\mu$m polarization-maintaining single-mode fiber is used as the input fiber 4a and 1.55 $\mu$m dispersion-shifted single-mode fiber is used as the output side fiber 4b. For coupling optical axes of output and input ports 1a and 1b and input and output fibers 4a and 4b, UV hardening adhesives is used.

A z-cut $LiNbO_3$ is used as the dielectric substrate 5a, and the propagation axis is disposed on Y-axis. The optical waveguide 2 having a Ti film thickness of 80 nm and Ti stripe width of 7 $\mu$m is formed in a wet atmosphere at diffusion temperature of 1050° C. for 8 hr. Subsequently, the silicon dioxide ($SiO_2$) optical buffer layer 6a of a thickness of 300 nm is formed by way of spattering.

For forming electrode 3, a Cr film with a thickness of 30 nm and a Au film of 300 nm are formed by way of spattering, and the electrodes 3a and 3b with an electrode width of 8 $\mu$m, an inter-electrode distance of 15 $\mu$m, and an electrode length of 20 mm, and the electrodes 3c and 3d with an electrode width of 8 $\mu$m, an inter-electrode distance of 15 $\mu$m, and an electrode length of 30 mm are formed by way of patterning. As the result, the polarization dependency ΔL of the optical waveguide 2 is reduced to −1.1 dB. In the case that a control RF signal V(t) 13a=Vp−p=7.7 V of RF frequency of 100 kHz is applied, the optical axis adjustment of the input fiber 4a results in D.O.P of the output light 9b of 5%.

Afterwards, the curing of optical axis of the input and output fibers 4a and 4b with UV hardening adhesives results in the increase of polarization dependency ΔL of −1.5 dB and the increase of D.O.P of 10%. However, D.O.P is improved to 1% by applying a control voltage Vd 19a of 14.5 V to the electrodes 4a and 4b.

As described hereinbefore, the first effect of the waveguide type polarization scrambler of the present invention aims to realize easily the optimization of randomized polarization state of output light without strict optical axis adjustment of the incident fiber and incident port. The optimization is possible because the polarization dependency is correctable by means of the Mach-Zehnder interferometic section.

The second effect aims to realize easily the optimization of randomized polarization state of output light even though the polarization dependency due to optical axis coupling is caused after optical axis adjustment. The optimization is possible because the polarization dependency is correctable by means of the Mach-Zehnder interferometic section.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A waveguide type polarization scrambler for depolarizing an input light signal comprising:

a Mach-Zehnder interferometic waveguide having first input and output optical waveguides and second input and output optical waveguides;

a dielectric optical waveguide substrate on which a phase modulator having third input and output optical waveguides and fourth input and output optical waveguides, said second input and output optical waveguides are connected to said third input and output optical waveguides;

a polarization maintaining fiber for inputting a light signal to said first input and output optical waveguides and for maintaining said light signal at a constant incident inclination angle; and light output means for receiving depolarized light emitted from said fourth input and output optical waveguides.

2. The waveguide type polarization scrambler as claimed in claim 1, wherein said dielectric optical waveguide substrate comprises lithium niobate.

3. The waveguide type polarization scrambler as claimed in claim 2, wherein said lithium niobate is Z-cut.

4. A waveguide type polarization scrambler for depolarizing an input light signal, comprising:

a Mach-Zehnder interferometic waveguide having first input and output optical waveguides and second input and output optical waveguides on a dielectric substrate;

a phase modulator having third input output optical waveguides and fourth input and output optical waveguides, wherein said second input and output optical waveguides are connected to said third input and output optical waveguides;

a polarization maintaining fiber for inputting a light signal to said fourth input and output optical waveguides and for maintaining said light signal at a constant incident inclination angle; and light output means for receiving depolarized light emitted from said first input and output optical waveguides.

5. The waveguide type polarization scrambler as claimed in claim 4, wherein said dielectric optical waveguide substrate comprises lithium niobate.

6. The waveguide type polarization scrambler as claimed in claim 5, wherein said lithium niobate is Z-cut.

7. A waveguide polarization scrambler for randomizing polarization of an input light signal, comprising:

a substrate having a film deposited thereon;

an optical waveguide patterned in said film, said optical waveguide comprising a first portion having an input port branching into two parallel waveguide sections, and a second portion wherein said two parallel waveguide sections rejoin to form a straight waveguide section terminating at an output port;

a Mach-Zehnder interferometer, positioned in said first portion of said optical waveguide, comprising a pair of metal electrodes formed over said two parallel waveguide sections;

a phase modulator comprising a pair of control electrodes in said second portion of said optical waveguide formed over said straight waveguide section;

a polarization maintaining fiber connected to said input port for keeping an input light linearly polarized at a constant inclination angle to said Mach-Zehnder interferometer;

a voltage supply for supplying a voltage to said pair of metal electrodes of said Mach-Zehnder interferometer to reduce a degree of polarization of said input light to zero; and phase modulation signal generation means for applying a phase modulation signal to said pair of electrodes in said phase modulator for randomizing a polarization of said input light exiting said exit port.

8. A waveguide polarization scrambler for randomizing polarization of an input light signal as recited in claim 7 wherein said substrate comprises $LiNbO_3$.

9. A waveguide polarization scrambler for randomizing polarization of an input light signal as recited in claim 7 wherein said film comprises Ti.

10. A waveguide polarization scrambler for randomizing polarization of an input light signal as recited in claim 7 wherein said phase modulation signal generation means generates a radio frequency signal.

* * * * *